March 22, 1932. L. BARNETT 1,850,616
ELECTRIC OUTLET BOX SUPPORT
Filed April 23, 1931
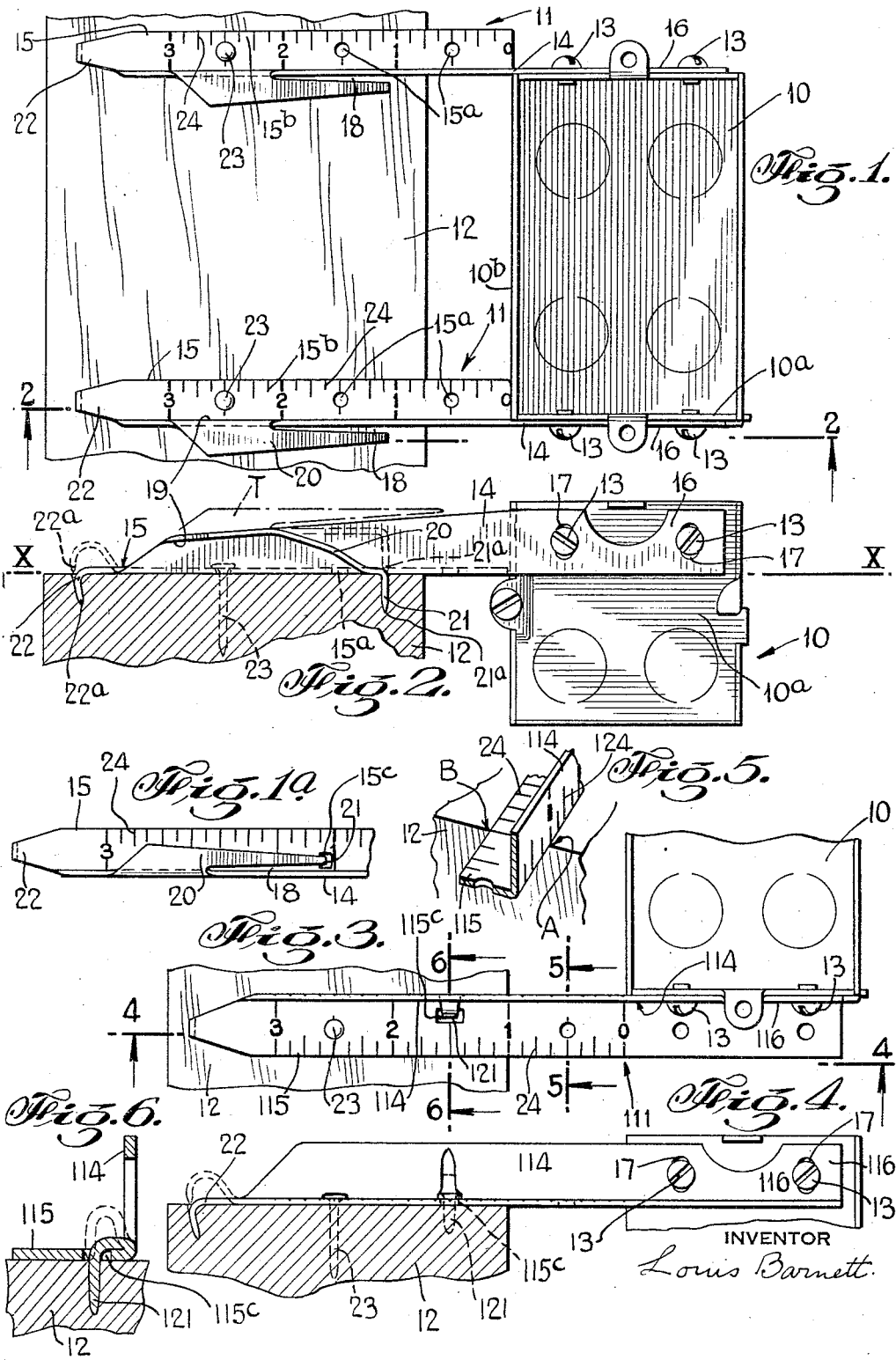
INVENTOR
Louis Barnett.

Patented Mar. 22, 1932

1,850,616

UNITED STATES PATENT OFFICE

LOUIS BARNETT, OF BROOKLYN, NEW YORK

ELECTRIC OUTLET-BOX SUPPORT

Application filed April 23, 1931. Serial No. 532,156.

This invention relates to devices for supporting outlet or junction boxes and the like, in electric wiring installations for building structures and for other similar purposes.

Among the objects of the invention is to provide improved supporting devices of the character described comprising few and simple parts which shall save time and facilitate the attachment of electric switch and junction boxes in a desired position to a building structure, which shall provide improved measuring means for positioning such boxes, and which shall be cheap to manufacture, and practical and efficient to a high degree in use.

Other objects of this invention will in part be obvious and in part hereinafter pointed out.

The invention accordingly consists in the features of construction, combinations of elements and arrangement of parts which will be exemplified in the construction hereinafter described and of which the scope of application will be indicated in the following claims.

In the accompanying drawings, in which is shown various possible illustrative embodiments of this invention.

Fig. 1 is a front elevational view of a switch and junction box mounted by means of an improved supporting device embodying the invention.

Fig. 1a is a fragmentary front elevational view of one end of an improved supporting device showing a modified construction thereof embodying the invention.

Fig. 2 is a side elevational view, partly in section, corresponding to a cut taken on lines 2—2 in Fig. 1.

Figs. 3 and 4 are fragmentary front and side elevational views, respectively, of a switch or junction box showing another modified construction of the improved supporting device.

Fig. 5 is a fragmentary perspective view as seen in the direction of the arrows from a cut taken on lines 5—5 of Fig. 3, and Fig. 6 is a cross-sectional view taken on lines 6—6 of Fig. 3.

Referring in detail to the drawings, 10 denotes an outlet box mounted by means of supporting devices 11 of improved construction embodying the invention on a building structure member or stud 12. The box 10 may be of any standard make and as here shown is of the switch or junction type having end walls 10a which are provided with spaced screws 13 for fastening the box 10 to the supporting devices 11.

Each device 11 is preferably made of sheet metal and comprises a strip portion 14 having an integral base portion 15 extending at right angles therefrom to form an angle structure. An end 16 of the strip portion 14 may extend beyond the base and is provided with suitable slots 17 spaced to receive the screws 13 for fastening the device 11 to the box wall 10a. The strip 14 adjacent the base portion 15 may be made of uniform width and may have a portion of the longitudinally extending edge thereof slitted at 18 and bent as at 19 to provide a resilient arm 20 which normally lies in a plane at right angles to the plane of the strip 14. Said arm 20 is terminated by a prong 21 which is bent to extend at right angles with respect to the structure member 12 into which it is adapted to be driven. The arm 20 and the prong 21 may be formed of the triangular-shaped material indicated at T, as bound by the dotted lines shown in Fig. 2. Said material T forms the same arm 20 and prong 21 before the same has been bent and shaped. The extreme end of the base 15 opposite the end 16 may extend beyond the strip 14, and may be cut and bent to provide a prong 22. Said base 15 may also be provided with spaced holes 15a through which fastening nails 23 are driven for rigidly fixing the devices 11 and the box 10 to the structure member 12.

The devices 11 are supplied to the trade with the prongs 21 and 22 in a so called "retracted" position, as shown in dotted lines in Fig. 2, the points of the prongs 21a and 22a of said prongs 21 and 22, respectively, being located on or above the level of the plane X—X of the surface of the structure member 12 to which the base 15 is secured. The exposed surface 15b of the base, may be provided with a suitable measuring scale 24 which preferably starts from zero (0) in a plane of alignment of the box side 10b, facing the structure member 12.

The use of the improved devices 11 will now be apparent. After said devices 11 have been attached to the opposite sides 10a of the box 10, the latter can be mounted in perfect alignment at a desired distance to overhang the structure member 12, by simply seating the bases 15 on the surface of said structure member 12 and shifting or sliding same until the scales 24 indicate the desired distance the box 10 is to be overhangingly mounted. The prongs 21 and 22 which are normally in their "retracted" position are then struck with a hammer for driving them into the structure member 12 to retain the devices 11 and box 10 in the desired aligned position until fastening nails 23 are driven into the openings 15a.

It is thus seen that the improved devices 11 eliminate the necessity of using the conventional form of portable measuring means, such as pocket foldable rulers, and indicate the exact overhang of the box 10 which permits checking the set position of the box 10 by mere observation. The so called "retracted" form of prongs, provided by the devices 11, do not interfere with the firm placing of bases 15 on the surface of the structure nor with the sliding movement of said bases in setting the box in a desired position. These novel forms of prongs obviously are improvements over the construction of fixedly extending prongs used heretofore on supporting devices to this type.

It is to be understood that in using the invention a single device 11, such as shown in Figs. 1 and 2 may be applied to one side of the box 10 and any other conventional form of device (not shown) on the other box side 10a, two supporting devices being generally necessary to secure the box 10 in position. When only one device 11 is used, the scale 24 serves to indicate the overhang as before, the box being lined up with the support in the usual manner. The prongs 21 and 22 on one device 11 when driven into the structure member 12 is generally sufficient to retain same in position until the nails 23 are driven home. It is also to be understood that in utilizing the invention, either prong 21 or prong 22 can be omitted, in which case the remaining prong may be long enough to afford an adequate attachment. Since the devices 11 can be set in desired alignment with their bases 15 firmly resting against the surface of the structure member 12, driving the prongs 21 or 22 into the latter has no tendency to disturb the setting, thereby facilitating installation of boxes in proper positions.

In Fig. 1a there is shown a modified construction of the invention in which the arm 20 is bent to overlie the base 15 instead of extending outwardly therefrom as shown in Figs. 1 and 2. When the arm 20 is bent as shown in Fig. 1a, the prong 21 is adapted to pass through an opening 15c provided in the base 15.

In Figs. 3, 4, 5, and 6, another modified construction of the invention is shown. Here the device 111 has its base portion 115 provided with a measuring scale 24 in the same manner as described above for the device 11, and in addition has another scale 124 provided on the outer upstanding side 114 of the strip member. With a single device 111 not only can the box 10 be readily mounted at a desired overhanging distance beyond the supporting member 12, but the box can be perfectly aligned with said member. As seen from Fig. 5, the scales 24 and 124 are spaced apart and by noting that the measurement at A for the scale 124 is the same as at B for the scale 24, perfect alignment is assured in the same way as when the two widely separated scales are provided, one on each device, as shown in Fig. 1. The two-scale arrangement on one device 111 also has the advantage that either scale is available for use, which is a desirable convenience should the device be positioned so that one scale is obstructed from view. The base 115 may also be provided with a "retracted" type of prong 22 and if desired the strip portion 114 may be punched along the mid-section thereof between the box attaching end 116 and the prong 22 to provide another "retracted" type of prong 121, the latter being adapted to pass through an opening 115c in the base 115 as is clearly shown in Fig. 6. The devices 111 are used in the same manner as described above for the device 11. Although the supporting devices 11 and 111 described above and shown in the drawings form units or pieces separately attachable to the box 10, the invention is equally applicable to nondetachable supporting means which may be integrally formed or permanently secured to extend from the boxes.

It will thus be seen that there is provided devices whereby the several objects of this invention are achieved and which are well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure by Letters Patent:

1. A supporting device of the character described for mounting an outlet box on a stud comprising a member having an angled portion, a flange of said portion forming a base attachable to the stud, the other flange formed with a retracted prong normally positioned to permit unobstructive seating of the base on the stud, said prong being movable with respect to the base for engaging the stud.

2. A supporting device of the character described for mounting an outlet box on a stud comprising a member having an angled portion, a flange of said portion forming a base attachable to the stud, the other flange and said base each being formed with a retracted prong normally positioned to permit unobstructed seating of the base on the stud, said prongs being movable beyond the base for entering the stud.

3. A box of the character described having spaced extensions for supporting a box on the stud, each extension comprising an angled member, a flange of said member forming a base attachable to the stud, the other flange formed with a retracted prong normally positioned to permit an unobstructive seating of the base on the stud and movable beyond the plane of the bases for entering the stud.

4. A supporting device of the character described for mounting an outlet box on a stud comprising a member having an angled portion, a flange of said portion forming a base attachable to the stud, the other flange formed with a retracted prong normally positioned to permit unobstructive seating of the base on the stud and movable beyond the base for engaging the stud, and measuring scales extending along each flange for aligning the device with a face of the stud.

5. In combination, a switch box and a pair of elongated ears for mounting said box on a wall stud, each ear comprising an integral member having a flat portion attached to an end face of the box, and another portion disposed in a plane at right angles to the plane of the first mentioned portion and forming a base constructed and arranged to rest flatly on the wall stud, and bearing on its exposed face a measuring scale having its zero line in alignment with the exterior face of the box disposed parallel to the stud, and a portion integral with each ear for anchoring said base to said stud.

6. In combination, a switch box and a pair of elongated ears, each comprising an integral member having two flanges in right angular relationship, one of said flanges including a box attaching portion, the other flange being constructed and arranged to rest flatly against a wall stud, and bearing on the exposed face thereof a measuring scale having its zero line in alignment with the exterior face of the box disposed parallel to the stud.

7. In combination, a switch box and a pair of elongated ears, each comprising an integral member having two flanges in right angular relationship, one of said flanges including a box attaching portion, the other flange being constructed and arranged to rest flatly against a wall stud, one of said ears bearing a pair of spaced measuring scales, each having its zero line in alignment with the exterior face of the box disposed parallel to the stud.

8. In combination, a switch box and a pair of elongated ears, each comprising an integral member having two flanges in right angular relationship, one of said flanges including a box attaching portion, the other flange being constructed and arranged to rest flatly against a wall stud, one of said ears bearing a pair of spaced measuring scales, each having its zero line in alignment with the exterior face of the box disposed parallel to the stud, one of said scales being disposed along the free edge of the exposed face of the flange resting against a wall stud, and the other scale being disposed on the remote face of the second flange and along the corner edge thereof.

9. In combination, a switch box and a pair of elongated ears for mounting said box on a wall stud, each comprising a flat portion attached to an end face of the box, and another portion disposed in a plane at right angles to the first part and forming a flat base, constructed and arranged to rest flatly on a stud, and having a retracted prong integral with each ear and normally positioned to permit unobstructed seating of said base on a stud, said prong being movable beyond the base for entering the stud, and for anchoring said box to said stud.

10. A device for supporting an outlet box from a wall stud comprising an elongated ear having one end portion extending in one plane for attaching to the box, the other end portion being constructed and arranged to rest flatly against the stud extending in a plane at right angles to the first mentioned plane, the last mentioned end portion bearing a measuring scale having a zero line for parallelly aligning the exterior face of the box with the stud.

11. A device for supporting an outlet box from a wall stud comprising an elongated ear having two flanges in right angular relationship, one of said flanges including a portion for attaching to the box, the other flange being constructed and arranged to rest flatly against the stud, said flanges each bearing a measuring scale having a zero line for parallelly aligning the exterior of the face of the box with the stud.

12. An outlet box having an open side, a bottom and walls extending between said open side and bottom, a nonextensible supporting device projecting outwardly from one of said walls, said device bearing a measuring scale having a zero line in register with the exterior face of the box wall.

In testimony whereof I affix my signature.

LOUIS BARNETT.